United States Patent [19]

Ludwig

[11] 4,064,894
[45] Dec. 27, 1977

[54] VACUUM REDUCER VALVE

[75] Inventor: George C. Ludwig, Troy, Mich.

[73] Assignee: The Bendix Corporation, South Bend, Ind.

[21] Appl. No.: 684,597

[22] Filed: May 10, 1976

Related U.S. Application Data

[63] Continuation of Ser. No. 520,325, Nov. 4, 1974, abandoned.

[51] Int. Cl.² .......................... G05D 11/00; F02P 5/04
[52] U.S. Cl. .............................. 137/116.5; 123/117 A
[58] Field of Search ................ 123/117 A; 137/116.3, 137/116.5

[56] References Cited

U.S. PATENT DOCUMENTS

| 3,250,288 | 5/1966 | Hammon | 137/116.3 |
|---|---|---|---|
| 3,370,577 | 2/1968 | Guetersloh | 123/117 A |
| 3,411,522 | 11/1968 | Golden et al. | 137/116.5 |
| 3,788,291 | 1/1974 | Wu | 123/117 A |
| 3,797,512 | 3/1974 | Martin | 137/116.5 |
| 3,996,955 | 12/1976 | Kawabata | 137/116.5 |

FOREIGN PATENT DOCUMENTS

| 1,095,766 | 12/1963 | Germany | 137/116.5 |
|---|---|---|---|
| 1,122,341 | 1/1962 | Germany | 137/116.5 |

Primary Examiner—Charles J. Myhre
Assistant Examiner—Ira S. Lazarus
Attorney, Agent, or Firm—Ken C. Decker; William N. Antonis

[57] ABSTRACT

A vacuum reducer valve is used in the distributor vacuum advance circuit in conjunction with an engine overheat detection three way valve which normally applies spark port vacuum to the distributor vacuum advance actuator. When the engine overheats, the spark port signal is blocked and manifold vacuum is applied to the distributor vacuum actuator. The manifold vacuum, however, averages three to four inches of mercury vacuum higher than the spark port vacuum thereby necessitating the use of a vacuum reducer valve in series with the manifold vacuum line to the distributor to avoid excessive spark advance.

4 Claims, 6 Drawing Figures

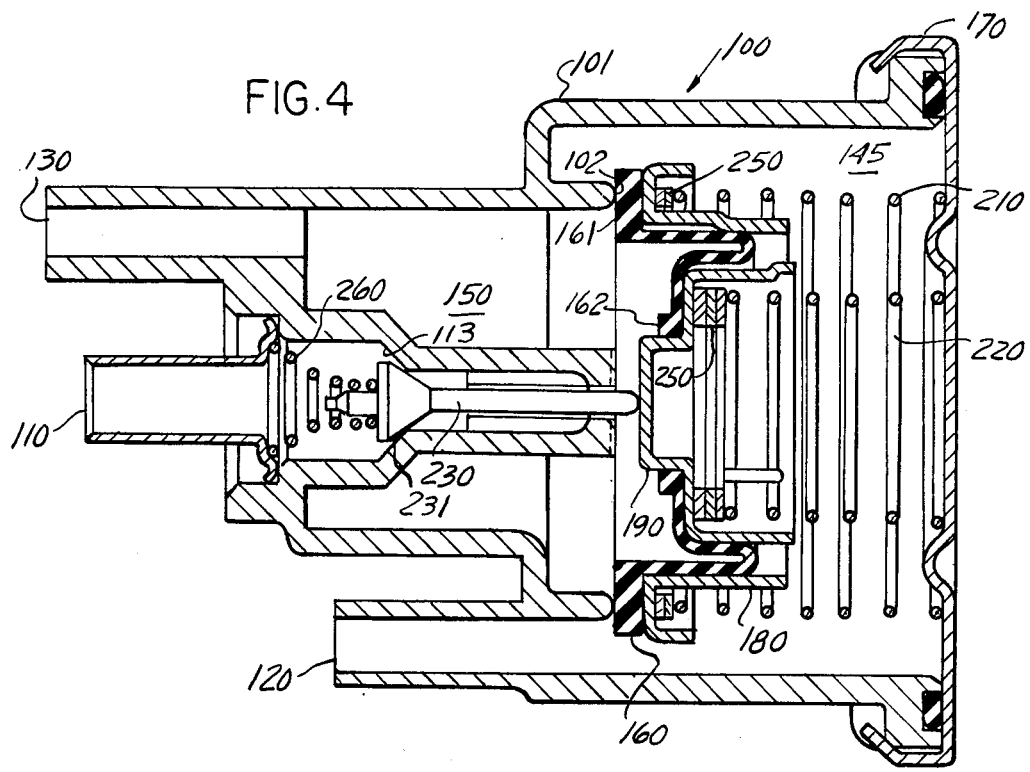
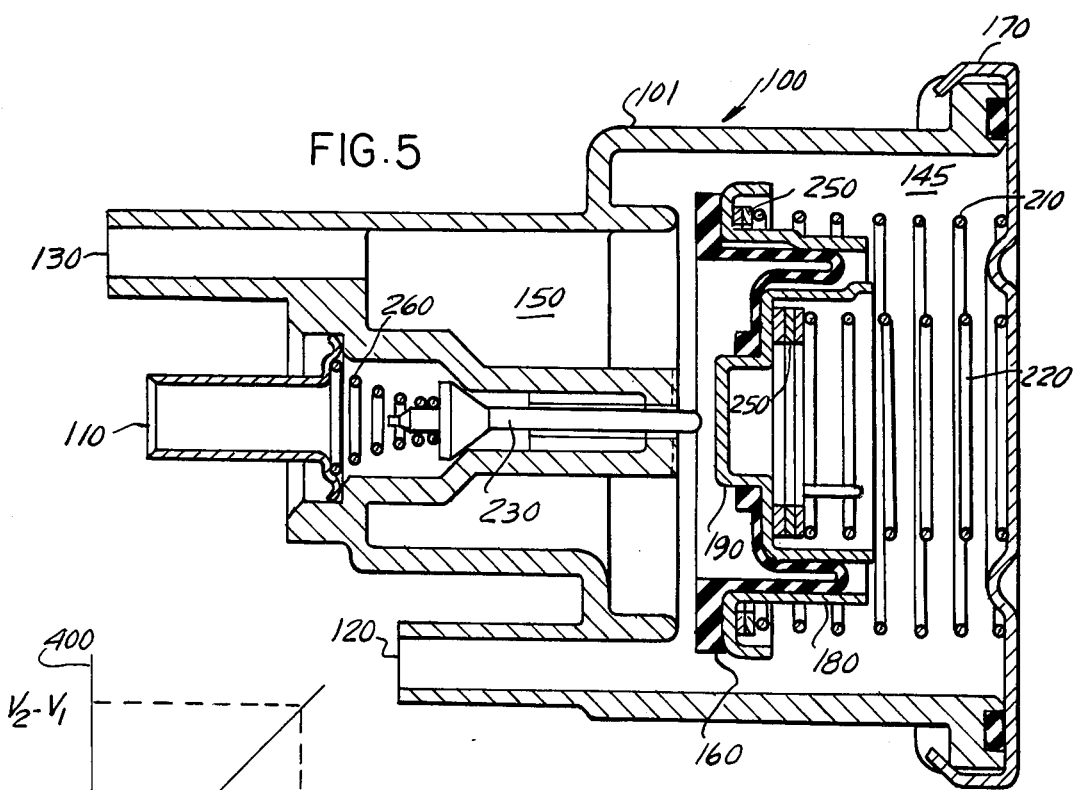

4,064,894

VACUUM REDUCER VALVE

This is a continuation, of application Ser. No. 520,325, filed Nov. 4, 1974 now abandoned.

BACKGROUND OF THE INVENTION

1. Field of the Invention

This invention relates to vacuum valves in general and, more particularly, to a vacuum reducer valve for producing an output signal at a predetermined vacuum level below an input vacuum signal.

2. Prior Art

Most present day motor vehicles have some sort of a vacuum servo automatically controlling advance or retard setting of the engine distributor braker plate as a function of carburetor spark port vacuum to provide good engine performance, as well as fuel economy during the various operating modes of the engine. With the current concern of noxious gases exhausted into the atmosphere, additional controls have been developed in conjunction with the above vacuum servo in an attempt to reduce the emission of noxious gases exhausted to the atmosphere. One such control is a solonoid operated vacuum control valve used to prevent advancing of the spark before the transmission is shifted into high gear. The solonoid, when energized, prevents carburetor spark port vacuum from advancing the spark by venting the distributor vacuum servo to atmosphere. As the transmission shifts into its high speed drive range, the solonoid coil is deenergized and the valve is effective to provide communication between the distributor vacuum servo and carburetor spark port vacuum. The spark advance then functions normally on carburetor spark port vacuum. Utilizing the solonoid valve to selectively control the distributor vacuum servo causes the engine to operate inefficiently during the idle mode. The reason for this problem is that at idle operation there is zero forward speed as well as high ambient pressure. Also, at idle there is no vacuum at the spark port, therefore, no vacuum spark advance. The advantage of operating with no vacuum spark advance or a retarded spark advance at idle operation is that it reduces the air pollution at idle operation. Such a mode of operation, however, gives rise to another serious problem inherent in the internal combustion engine. Retardation of the spark causes the operating temperature of the engine to rise, and continued operation with a retarded spark causes the temperature to rise to prohibitive levels. By contrast, an advance of the spark, while resulting in more complete combustion and an intended increase in noxious gases being exhausted from the engine, has the salutary effect of reducing the operating temperature of the engine.

To avoid overheating of the internal combustion engine during the idle mode, an engine overheating detection valve, commonly called temperature variable switch (T.V.S. valve), is used in the distributor vacuum spark advance circuit. The T.V.S. valve is a three way valve which normally applies spark port vacuum to the distributor vacuum advance actuator. When an engine overheat condition is encountered, the spark port signal lines are blocked and manifold vacuum is applied to the distributor vacuum actuator. The manifold vacuum, however, averages 3½ inches of mercury vacuum higher than the spark port vacuum thereby presenting the problem of the need of a vacuum reducer valve in series with the manifold vacuum line to the distributor to avoid excessive spark advance.

SUMMARY OF THE INVENTION

The invention is a vaccum reducer valve that provides a vacuum output, a predetermined vacuum level below the vaccum input. The invention permits the use of manifold vacuum for controlling the distributor vacuum spark advance actuator when an engine overheat condition is encountered. The normal vacuum advance to the distributor, namely spark port vaccum, is blocked during an engine overheat condition and, therefore, the use of manifold vacuum to control the distributor vacuum spark advance actuator permits increased cooling of the engine during an operational mode where cooling is essential to maintain continued operation of the engine.

The invention is a vacuum reducer valve characterized by a dual function diaphragm operating within a housing which contains a vacuum input, a vacuum output, and an atmospheric vent. The dual function diaphragm operates to maintain a predetermined vacuum differential between the input and output and also acts to vent the distributor line during decreasing input vacuum conditions to maintain the required differential.

It is an object of the invention to maintain the output of the vacuum reducer valve at a predetermined vacuum differential from the input source.

Another object of the present invention is to provide a new and improved vacuum reducer valve which is of the simple design, is easy to assemble and economical to commercially manufacture.

It is another object of the present invention to provide a vacuum reducer valve which is compatible with the expected environment and which overcomes the disadvantages of similar type valves.

A further object of the invention is to isolate the vacuum source and the atmospheric source from each other in the vacuum reducer valve.

Other objects, features, and advantages of the present invention will become apparent from the description which follows taken in conjunction with the accompanied drawings which show a preferred embodiment of the invention.

BRIEF DESCRIPTION OF THE FIGURES

In the drawings:

FIG. 4 is a sectional view similar to that of FIG. 3 with the diaphragm in a first operational position;

FIG. 5 is a sectional view similar to that of FIG. 3 with the diaphragm in a second operational position.

FIG. 6 is a graph of the operation of the vacuum reducer valve.

DESCRIPTION OF THE PREFERRED EMBODIMENT

Figure 1:
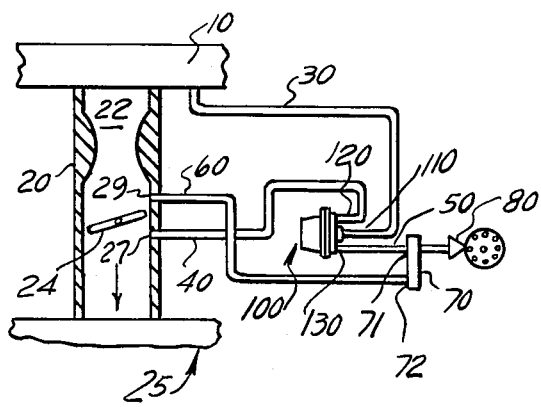
FIG. 1 is a schematic of a carburetor system incorporating the vacuum reducer valve controlling the distributor vacuum advance motor.
Figure 2:
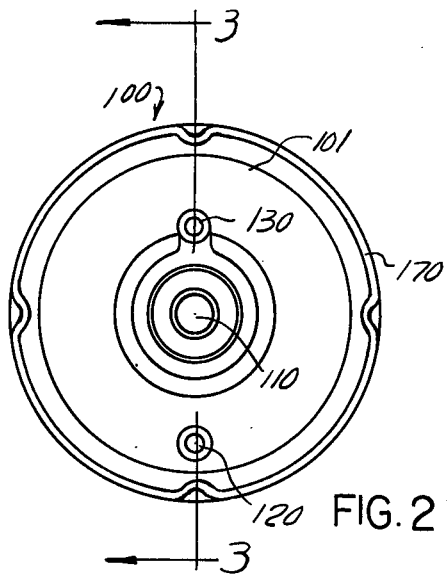
FIG. 2 is a top view of the vacuum reducer valve.

Referring to the FIGURES, there is illustrated in FIG. 1 a schematic of a carburetor system as may be used with an internal combustion engine. The purpose of the system in FIG. 1 is to control the distributor advance vacuum servo thereby controlling the firing point of the fuel in the cylinders of the engine. An air cleanser 10 is positioned over the top of a carburetor intake conduit 20 for cleaning the air which flows along the conduit through the venturi section 22 past the throttle plate 24 and to the manifold 25. Secured to the air cleanser on the clean air side is a conduit 30 which may be rigid or flexible for supplying clean air at atmospheric pressure to one input 110 of the vacuum reducer valve 100 of the present invention. A second input 120 to the vacuum reducer valve is connected by means of another conduit 40 to a vacuum source 27 in the air intake conduit 20. This vacuum source 27 is downstream from the throttle plate 24 and supplies a vacuum source hereinafter referred to as the manifold vacuum. The output 130 of the vacuum reducer valve 100 is connected by means of a third conduit 50 to one input 71 of a thermal switch 70 and from there to the distributor advance vacuum servo 80. Another input 72 to the thermal switch 70 is connected by means of a conduit 60 to the ported spark vacuum source 29 in the carburetor intake conduit 20.

In an internal combustion engine the intake manifold vacuum is at a large value in terms of inches of mercury at idle condition of the engine and decreases to substantially zero vacuum at wide open throttle condition. It is the function of the vacuum reducer valve 100 to supply a vacuum control signal to the distributor vacuum servo at a predetermined vacuum differential level from that of the manifold vacuum or vacuum reducer valve input vacuum. In a decreasing vacuum condition, in order to provide an output vacuum, it is necessary to mix or delute, under controlled conditions, the manifold vacuum as supplied to the vacuum reducer valve 100 with air at atmospheric pressure. In an increasing vacuum condition the reducer valve 100 supplies vacuum from the vacuum source 27. This reduced vacuum is supplied through a thermal vacuum switch 70 to the distributor vacuum advance servo 80. The thermal vacuum switch 70, in one embodiment, is sensitive to engine coolant temperatures and will connect the output of the vacuum reducer valve 100 to the distributor vacuum advance motor 80 whenever the engine coolant temperatures reaches an abnormally high temperature. Normally, the vacuum applied to the distributor vacuum advance motor 80 is a much lower vacuum, such as that at the ported spark output 29 of the carburetor intake conduit 20 upstream of throttle plate 24, as illustrated in FIG. 1 or from the venturi section 22 of the intake conduit. In either case, this vacuum may be lower than the manifold vacuum. However, in a system wherein the thermal switch 70 senses that the cooling system temperature is above a predetermined level, it is necessary to advance the firing of fuel in the cylinders of the engine thereby permitting the engine to run more efficiently and lowering the engine temperature. This is accomplished by the thermal switch 70 switching to the higher source vacuum output from the vacuum reducer valve 100, and applying the higher source vacuum to the distributor vacuum advance servo causing the spark to be advanced. Under these conditions, advancing the spark results in earlier detonation of the fuel and, therefore, a more efficient conversion of fuel into mechanical energy instead of heat energy.

As mentioned above, during normal driving conditions, the distributor vacuum advance servo is calibrated to be controlled directly by the ported spark vacuum 29. However, under certain loads, speed or idle conditions, this results in the vacuum servo causing a retarded spark. A retard spark operation increases the heat rejected to the engine coolant and causes the engine coolant to run hotter. At a predetermined coolant temperature the distributor spark must be advanced to provide additional cooling and reduce this added heat in the engine coolant, if the engine is expected to continue running without heat damages to its components. If the thermal swith 70 connected to the manifold vacuum 27 to the distributor vacuum advance servo, an excessive amount of advance will be produced and the engine will knock. Knock is caused by pre-ignition of the fuel in the cylinders. The vacuum reducer valve 100 provides a vacuum that is a predetermined vacuum differential lower than the manifold vacuum to advance the distributor timing sufficiently to permit the engine to function more efficiently thereby reducing engine coolant temperature and also avoid over advancing the distributor so as to eliminate engine knock.

Figure 3:
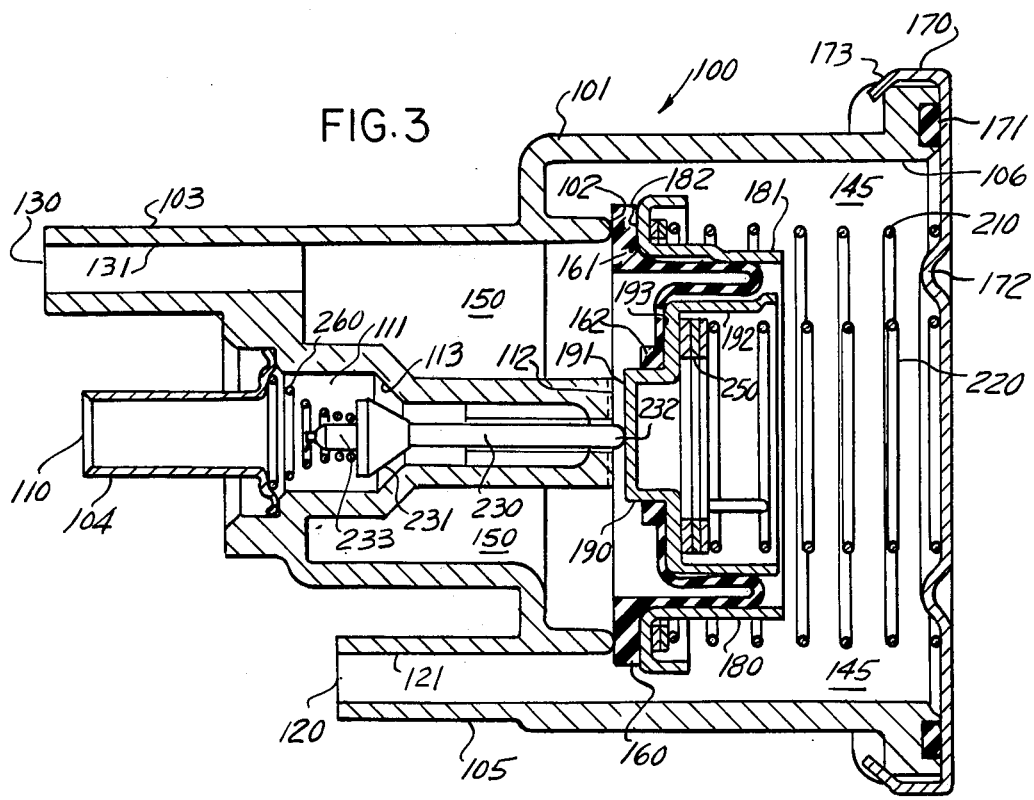
FIG. 3 is a sectional view taken along Lines 3—3 of FIG. 2 with the diaphragm in a third operational position.

Referring now to FIG. 3, there is illustrated a sectional view of the preferred embodiment of the vacuum reducer valve 100. In general, the valve housing 101 has a central passage with a valve seat 102 defining a first chamber 145 and a second chamber 150. One end of the central passage terminates in an output port 130, a vent port 110, and an input port 120. The input, output and vent ports have respective nipple extentions 105, 103 and 104 for connecting a conduit thereto. The output port 130 and the vent port 110 communicate with the second chamber 150, while the input port 120 communicates with the first chamber 145. Interposed in the space between and separating the first and second chambers is a flexible diaphragm 160. The first chamber is further defined by a cover member 170 mounted by any suitable means such as swaging or staking to the opposite end of the housing's central passage. The cover member 170, in conjunction with a suitable sealing means, such as "O" ring 171, cooperates to seal the first chamber thereby preventing fluid flow out of the open end of the central passage. The cover member 170 has a cylindrical raised portion 172 axially aligned with vent port passage 111 for a purpose later to be disclosed. Interposed between the outer portion 161 of diaphragm 160 and cover member 170 is an outer cup retainer member 180. The outer cup retaining member has one end portion 182 adapted to receive one end of a first spring 210 and the outer portion 161 of the diaphragm 160. The opposite end of the first spring 210 is mounted on the outer diameter of the raised portion 172 in cover member 170. The opposite end of the outer cup retainer 180 is adapted to align coaxially with the axis of the first spring 210. An inner cup retainer member 190 is adapted at one end 191 to locate against the forward end 112 of the vent passage 111. The opposite end 192 of the inner cup member 190 is adapted to receive a second spring 220 and coaxially aligned therewith. Interposed between the one end 191 of inner cup retainer member 190 and the opposite end of the inner cup retainer member 192 is a radial flat portion 193 adapted to receive the inner portion 162 of the diaphragm 160. The outer portion 161 of the diaphragm forms a valve body which communicates with the valve seat 102. The inner portion 162 of the diaphragm forms a seal with the radial flat portion 193 of the inner cup retainer member 190. The second spring 220 is biased to act towards the vent port 110 and is mounted coaxially with the first spring 210 against the cover member 170 at the inner diameter of the raised portion 172. The desired output of the springs 210 and 220 is obtained by providing a suitable calibrating means such as shims (250).

The vent port passage 111 is adapted to provide a valve seat 113 for the valve body 231 located on a needle valve 230. The needle valve 230 has a forward portion 232 which is located against the one end portion 191 of inner cup retainer member 190. The rearward portion of the needle valve 230 terminates in a valve body 231 and a spring retaining means 233. A suitable biasing means 260 is located between the one end of a vent port nipple extension 104 and the retaining means 233, and is axially aligned with needle valve 230 to provide a sufficient biasing force to maintain needle valve body 231 in engagement with valve seat 113. At rest, the compression force of the biasing means 220 causes the needle valve 230 to be unseated, resulting in the one end portion 191 of inner cup retaining member to be in contact with the forward end portion 112 of the passage 111 and the forward portion 232 of the piston 230.

Referring to FIG. 6, there is graphically illustrated the operation of the vacuum reducer valve 100. Along the abscissa 300 of the graph the vacuum input to the first chamber is plotted in inches of mercury, and along the ordinate 400 of the graph the vacuum output of the reducer valve 100 is plotted in inches of mercury. The reducer valve 100 is designed to produce a vacuum output that is a predetermined level lower, $V_1$ on the graph, than the input vacuum. Thus, for a vacuum $V_2$ on the input, the output is $(V_2 - V_1)$. In the present embodiment $V_1$ is equal to 3½ inches of mercury.

OPERATION

The vacuum reducer valve diaphragm 160 has three basic operating positions, as shown in FIGS. 3, 4 and 5, and a non-operations or normal rest position which can best be illustrated from FIG. 3. In the normal or rest position the vacuum source at inlet port 120 is zero inches of mercury. At the rest position the biasing force of the spring 220 is greater than the biasing force of the spring 260 and, therefore, the inner cup retainer 190 is directed away from the cover member 170 until the one end 191 of the inner cup retainer member 190 contacts the forward end 112 of the vent passage 111. The biasing force of spring 220 thereby causes the needle valve member 230 to be unseated from the valve seat 113 and permits cummunication from the outlet port 130 to the vent port 110 through the outlet passage 131, the second chamber 150 within the central passage of the valve and the vent passage 111 and the forward portion 232 of the piston 230. The outer cup retainer member 180 is biased by the first spring 210 towards the valve seat 102. The outer diaphragm portion 161, acting as a valve body, seats on the valve seat 102 when the valve is at rest or normal position. In this rest position there is fluid communication between the outer port 130 and the vent port 110 through the vent passage 111, the second chamber 150 and the outlet passage 131. There is also fluid communication between the input port 120 and the first valve chamber 145 through vent passage 121.

The first operational condition of the vacuum reducer valve is illustrated in FIG. 4. In FIG. 4 the vacuum source at the inlet port 120 increases from zero inches of mercury to an equilibrium position which is equivalent to the predetermined pressure differential between the inlet port and the outlet port, as designated by $V_1$ in FIG. 6. The increase in vacuum begins to act on the inner portion 162 of the diaphragm 160 first, since the force generated by the vacuum that acts on the effective area of the inner portion of the diaphragm 160 is greater than the preload of second spring 220. The inner cup retainer member 190, therefore, begins to travel towards the cover member 170 allowing needle valve body 231 under the influence of spring 260 to become seated on the valve 113. Upon seating of the needle valve 230 the output port 130 ceases to communicate with the vent port 110 and continues to communicate with the second chamber 150 of the valve. Since the outer portion 161 of the diaphragm is still seated on valve seat 102, the vacuum in the second chamber 150 is still at atmospheric level, therefore, the output port will still be at zero vacuum. The compression spring force of second spring 220 at this equilibrium position is at its working length maintaining the vacuum level in the second chamber 150 at a predetermined vacuum differential less than the vacuum source in the first chamber 145.

As the input vacuum increases along the abscissa in FIG. 6, beyond the point $V_1$, the diaphragm 160 begins to modulate about the first position and will move towards a second position, as illustrated in FIG. 5. This position is a temporary position in that whenever the pressure or vacuum in the second chamber 150, the output vacuum for a given input vacuum falls on the graph plot of FIG. 6, the first spring 210 will move the diaphragm 160 back to the location shown in FIG. 4.

FIG. 3 illustrates the third operational mode of the vacuum reducer valve. If the vacuum in the first chamber 145 drops further than the predetermined differential pressure $V_1$, the inner retaining member 190 will modulate towards the needle valve 230 and briefly move the valve body 231 away from the valve seat 113 and permit a fluid communication between the atmosphere, as sensed at the vent port 110 and the second chamber 150. This will reduce the vacuum in the second chamber 150 until the predetermined vacuum differential $V_1$ is again established between chambers 150 and 145 or across diaphragm 160. When the predetermined vacuum differential is again established, the needle valve 230 will then seat and maintain this predetermined vacuum pressure differential $V_1$. This latter condition is shown in FIG. 3 where the vacuum in the first chamber 145 is declining and the needle valve is permitted to unseat to allow the vacuum in the second vacuum chamber 150 to decline and maintain a predetermined vacuum differential between the chambers 145 and 150.

There has, thus, been shown and described a vacuum reducer valve 100 for maintaining the output of the valve within a predetermined vacuum differential from the input vacuum source. As the input vacuum varies the flexible diaphragm 160 cooperates with the needle valve 230 and the valve seat 102 to modulate the output vacuum, providing the correct measure of atmospheric pressure and vacuum to maintain a desired vacuum output which is a predetermined differential from the input vacuum.

Although only one embodiment of the present invention has been illustrated in the accompanying FIGURES and described in the foregoing specification, it is to be especially understood that various changes may be made to the embodiment shown and described without departing from the spirit and scope of the invention as will be apparent to those skilled in the art, i.e. by using a pressure source as an input, a pressure output can be controlled at source value greater than said input thereby in effect the valve can be used as a pressure amplifier.

Accordingly, it is intended that the illustrative and description materials herein be used to illustrate the principles of the invention and not to limit the scope thereof.

What is claimed is:

1. In a vacuum reducer valve:
 a housing defining a chamber therewithin and having an inlet, an outlet, and a vent communciating with said chamber;
 normally open valve means controlling communication through said vent;
 normally closed valve means within said chamber dividing the latter into an inlet section communicating with said inlet and an outlet section communicating with said outlet and with said vent;
 pressure differential responsive means including a first portion responsive to the pressure differential between said sections for closing said normally open valve means and thereby preventing communication through said vent when the pressure level in said inlet section drops below the pressure level in said outlet section by a first predetermined amount;
 said pressure differential responsive means including a second portion responsive to the pressure differential between said sections for opening said normally closed valve means and thereby communicating said inlet and outlet sections when the pressure level in said inlet section drops below the pressure level in said outlet section by a second predetermined amount, said second predetermined amount being greater than said first predetermined amount whereby said normally open valve means is closed to prevent communication through said vent before said normally closed valve means is opened;
 said normally open valve means including a valve seating area associated with said vent, a valve poppet associated with said seating area and having an actuating member extending into said chamber and spring means yieldably urging said valve poppet toward said valve seating area;
 said first portion of said pressure differential responsive means including a retainer slidable in said chamber and responsive to the pressure differential between said sections, and resilient means urging said retainer toward said actuating member, said resilient means being stronger than said spring means so that said retainer acting through said actuating member urges the poppet away from the valve seating area when the pressure differential is less than the predetermined amount.

2. In a vacuum reducer valve:
 a housing defining a chamber therewithin and having an inlet, an outlet, and a vent communicating with said chamber;
 normally open valve means controlling communication through said vent;
 normally closed valve means within said chamber dividing the latter into an inlet section communicating with said inlet and an outlet section communicating with said outlet and with said vent;
 pressure differential responsive means including a first portion responsive to the pressure differential between said sections for closing said normally open valve means and thereby preventing communication through said vent when the pressure level in said inlet section drops below the pressure level in said outlet section by a first predetermined amount;
 said pressure differential responsive means including a second portion responsive to the pressure differential between said sections for opening said normally closed valve means and thereby communicating said inlet and outlet sections when the pressure level in said inlet section drops below the pressure level in said outlet section by a second predetermined amount, said second predetermined amount being greater than said first predetermined amount whereby said normally open valve means is closed to prevent communication through said vent before said normally closed valve means is opened;
 said normally closed valve means including a valve seat carried by said housing and a valve member slidably mounted in said chamber;
 said normally open valve means including a valve seating area associated with said vent, a valve poppet associated with said seating area and having an actuating member extending into said chamber, and spring means yieldably urging said valve poppet toward said valve seating area;
 said first and second portions of said pressure differential responsive means including a first retainer slidable in said chamber and engaging said valve member, first resilient means urging said retainer and said valve member toward said valve seat, a second retainer slidable in said chamber, second resilient means urging said second retainer toward said actuating member, and a flexible diaphragm interconnecting said retainers.

3. The invention of claim 2:
 said second resilient means being stronger than said spring means but weaker than said first resilient means whereby said second retainer urges said first valve means open when the pressure differential between said sections is less than said first predetermined amount but permits said poppet to close with said valve seating area when said second pressure differential is larger than said first predetermined amount and said valve member moves away from said valve seat when the pressure differential between said sections attains said second predetermined amount, said second predetermined amount being greater than the first predetermined amount.

4. The invention of claim 3:
 said valve seat being carried by the wall of said housing and circumscribing said chamber, said first retainer being coaxial with said second retainer, said diaphragm being an annular member coaxial with said retainer.

* * * * *